United States Patent
Huang et al.

(10) Patent No.: US 11,699,948 B2
(45) Date of Patent: Jul. 11, 2023

(54) POWER SUPPLY SYSTEM WITH SELF-EXCITED DRIVE FUNCTION

(71) Applicant: DELTA ELECTRONICS, INC., Taoyuan (TW)

(72) Inventors: Wen-Yu Huang, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 374 days.

(21) Appl. No.: 17/166,369

(22) Filed: Feb. 3, 2021

(65) Prior Publication Data
US 2022/0045598 A1    Feb. 10, 2022

Related U.S. Application Data

(60) Provisional application No. 63/062,906, filed on Aug. 7, 2020.

(51) Int. Cl.
*H02M 1/32*     (2007.01)
*H02M 3/155*    (2006.01)
*H02M 1/00*     (2006.01)

(52) U.S. Cl.
CPC ............ *H02M 1/32* (2013.01); *H02M 3/155* (2013.01); *H02M 1/0009* (2021.05)

(58) Field of Classification Search
CPC ....... H02M 1/32; H02M 3/155; H02M 1/0009
See application file for complete search history.

(56) References Cited

U.S. PATENT DOCUMENTS

| | | |
|---|---|---|
| 4,523,248 A | 6/1985 | Schmale et al. |
| 2013/0106469 A1 | 5/2013 | Slavov et al. |
| 2013/0320767 A1 | 12/2013 | Huang et al. |
| 2014/0192564 A1 | 7/2014 | Tang et al. |

(Continued)

FOREIGN PATENT DOCUMENTS

| | | |
|---|---|---|
| EP | 0096915 | 12/1983 |
| JP | H-0720952 A | 1/1995 |

(Continued)

OTHER PUBLICATIONS

U.S. Appl. No. 17/166,260, filed Feb. 3, 2021.

*Primary Examiner* — Rafael O De Leon Domenech
(74) *Attorney, Agent, or Firm* — Muncy, Geissler, Olds & Lowe, P.C.

(57) ABSTRACT

A power supply system with self-excited drive function includes a power supply apparatus, a logic disconnection circuit, a self-boosting circuit, a protection circuit, and a current sensing unit. The logic disconnection circuit is coupled between a positive power wire and a negative power wire. The self-boosting circuit converts a voltage into an auxiliary voltage, and the self-boosting circuit is coupled to the logic disconnection circuit to receive the auxiliary voltage. The current sensing unit outputs a current sensing signal according to a current flowing through the positive power wire or the negative power wire. The protection circuit makes a short circuit or an open circuit between the positive power wire and the negative power wire according to the current sensing signal. The logic disconnection circuit disables or enables the self-boosting circuit according to the voltage between the positive power wire and the negative power wire.

13 Claims, 10 Drawing Sheets

(56) References Cited

U.S. PATENT DOCUMENTS

2014/0301003 A1    10/2014  Jankowski
2020/0195127 A1*   6/2020   Garbossa ................ H02M 1/08
2021/0226442 A1*   7/2021   Cao ........................ H02H 9/025

FOREIGN PATENT DOCUMENTS

JP    2011024303 A    2/2011
JP    2013252046 A    12/2013

* cited by examiner

POWER SUPPLY SYSTEM WITH SELF-EXCITED DRIVE FUNCTION

CROSS-REFERENCE TO RELATED APPLICATION

This patent application claims the benefit of U.S. Provisional Patent Application No. 63/062,906, filed Aug. 7, 2020, which is incorporated by reference herein.

BACKGROUND

Technical Field

The present disclosure relates to a power supply system with self-excited drive function, and more particularly to a power supply system with self-excited drive function that enables and disables a self-boosting operation according to whether a load draws current or not.

Description of Related Art

The statements in this section merely provide background information related to the present disclosure and do not necessarily constitute prior art.

The power supply apparatus of the power supply system is used to supply the required power to a load. If the distance between the load and the power supply apparatus is far, a disconnection apparatus is usually installed between the load and the power supply apparatus to avoid hazard to personnel safety and damage to equipment protection since there is still electricity on transmission lines between the power supply apparatus and the load once the load occurs abnormality or the load is not ready to receive the power electricity.

The conventional disconnection apparatus may operate in the following manners. 1. Both the load and the shutdown apparatus need additional communication units, and the communication units are coupled and communicate to each other by a signal line. 2. The shutdown apparatus is a manual switch, and the operator manipulates the shutdown apparatus according to the condition of the load. No matter which manner is used, the costs of the power supply system, including labor cost, circuit cost, and so forth are significantly increased. Therefore, the present disclosure provides a safety shutdown apparatus with self-driving control.

SUMMARY

An object of the present disclosure is to provide a power supply system with self-excited drive to solve the problems of existing technology.

In order to achieve the above-mentioned object, the power supply system with self-excited drive function is coupled to a power receiving apparatus through a positive power wire and a negative power wire. The power supply system includes a power supply apparatus, a logic disconnection circuit, a self-boosting circuit, a protection circuit, and a current sensing unit. The power supply apparatus outputs a DC power source between the positive power wire and the negative power wire. The logic disconnection circuit is coupled between the positive power wire and the negative power wire. The self-boosting circuit is coupled between the positive power wire and the negative power wire, and converts a voltage between the positive power wire and the negative power wire into an auxiliary voltage, and a receiving end of the self-boosting circuit is coupled to an output end of the logic disconnection circuit. The protection circuit is coupled between the positive power wire and the negative power wire, and is coupled to the self-boosting circuit to receive the auxiliary voltage. The current sensing unit is coupled to the positive power wire or the negative power wire, and outputs a current sensing signal according to a current flowing through the positive power wire or the negative power wire. The protection circuit makes a short circuit or an open circuit between the positive power wire and the negative power wire according to the current sensing signal, and the logic disconnection circuit disables or enables the self-boosting circuit according to the voltage between the positive power wire and the negative power wire.

In one embodiment, when the current sensing signal is a first level, the protection circuit makes the positive power wire and the negative power wire be short-circuited; when the current sensing signal is a second level, the protection circuit makes the positive power wire and the negative power wire be open-circuited.

In one embodiment, the protection circuit includes a switch coupled between the positive power wire and the negative power wire; when the switch is turned on, the positive power wire and the negative power wire are short-circuited; when the switch is turned off, the positive power wire and the negative power wire are open-circuited.

In one embodiment, the protection circuit includes a first switch coupled between the positive power wire and the negative power wire, and a second switch coupled to the positive power wire or the negative power wire; the first switch and the second switch are complementarily controlled.

In one embodiment, the self-boosting circuit includes a transistor switch, a coupling coil, and a capacitor. The coupling coil has two magnetically coupled coils, wherein one end of each of the two coils is commonly coupled to each other, and the other end of each of the two coils is respectively coupled to a base and a collector of the transistor switch. The capacitor is coupled to the collector of the transistor switch, and provides the auxiliary voltage.

In one embodiment, the self-boosting circuit further includes a switch component; a control end of the switch component is the receiving end of the self-boosting circuit; the logic disconnection circuit disables the self-boosting circuit by turning off the switch component.

In one embodiment, the switch component is coupled between the positive power wire and the coupling coil.

In one embodiment, the switch component is coupled between the negative power wire and the coupling coil.

In one embodiment, the logic disconnection circuit disables the self-boosting circuit when the voltage between the positive power wire and the negative power wire is greater than a threshold voltage value.

In one embodiment, the self-boosting circuit further includes a diode; the diode is coupled between the positive power wire and the capacitor.

In one embodiment, the protection circuit further includes a diode; the diode is coupled to the switch in series.

In one embodiment, the power supply apparatus is a solar panel.

In one embodiment, the current sensing unit is a Hall sensor, and receives the auxiliary voltage.

Accordingly, the power supply system with self-excited drive function uses the protection circuit to provide a short-circuited path to limit the output voltage of the power supply apparatus to ensure the safety of the operators and protecting the equipment when the power receiving apparatus has not drawn current yet, and uses the self-boosting circuit to boost a small voltage to a large voltage to maintain sufficient voltage for supplying the protection circuit and the current sensing unit with a higher voltage to make them normally operate.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
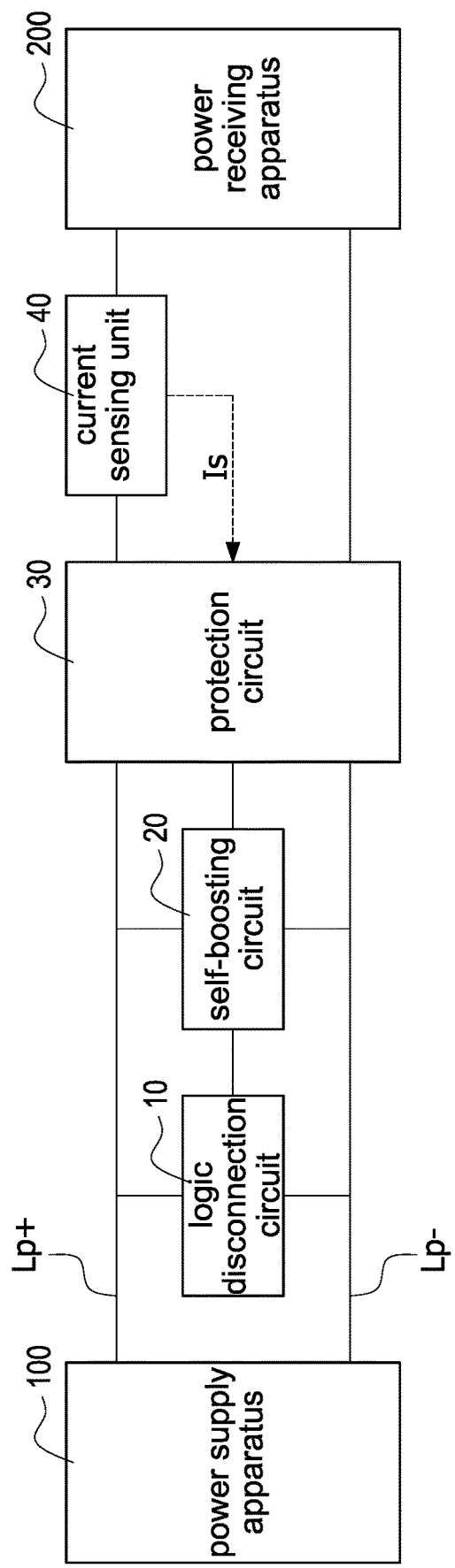
FIG. 1 is a block diagram of a power supply system with self-excited drive function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a power supply system with self-excited drive function according to the present disclosure. The power supply system with self-excited drive function (hereinafter referred to as "power supply system") includes a power supply apparatus 100, a logic disconnection circuit 10, a self-boosting circuit 20, a protection circuit 30, and a current sensing unit 40, and supplies power to a power receiving apparatus 200. In one embodiment, the power supply apparatus 100 is an apparatus that provides DC power output.

As shown in FIG. 1, the power receiving apparatus 200 is coupled to the power supply apparatus 100 through a positive power wire Lp+ and a negative power wire Lp−. The logic disconnection circuit 10 is coupled between the positive power wire Lp+ and the negative power wire Lp−. The self-boosting circuit 20 is coupled between the positive power wire Lp+ and the negative power wire Lp−, and a receiving end of the self-boosting circuit 20 is coupled to an output end of the logic disconnection circuit 10. The protection circuit 30 is coupled between the positive power wire Lp+ and the negative power wire Lp−, and the protection circuit 30 is coupled to an output end of the self-boosting circuit 20. The current sensing unit 40 is coupled to the positive power wire Lp+ or the negative power wire Lp−, and detects a current flowing through the positive power wire Lp+ or the negative power wire Lp−. In this embodiment shown in FIG. 1, the current sensing unit 40 is coupled to the positive power wire Lp+.

The power supply apparatus 100 is a power apparatus that can output DC power. In the following, a solar panel is used as the power supply apparatus 100 and a solar inverter is used as the power receiving apparatus 200 as an example. When the solar inverter used in construction with the solar panel is in an unprepared condition, or the solar inverter needs to be urgently powered off (for example, repairs, fire, or other abnormal conditions), in order to prevent the continuous output of the DC power from the solar panel from causing casualties, the protection circuit 30 can make the positive power wire Lp+ and the negative power wire Lp− be short-circuited so that the voltage provided to the solar inverter is reduced to a very small voltage value, such as about 1 volt. Therefore, it is to ensure the probability and degree of equipment loss and personal injury are minimized. The power supply apparatus 100 may also be, for example, a power supply with a high-voltage DC output that can supply power to a remote small base station, and the power receiving apparatus 200 may be a communication facility such as a small base station. When the power receiving apparatus 200 does not completely draw current (for example, repairs or other abnormal conditions), the protection circuit 30 can be also used to ensure that the voltage of the power receiving apparatus 200 reaches a safe voltage.

Hereinafter, the operation of the power supply system of the present disclosure will be described. Please refer to FIG. 2, which shows a block circuit diagram of the power supply system according to a first embodiment of the present disclosure. When the power supply apparatus 100 has not outputted voltage and the power receiving apparatus 200 is unprepared (not ready), a current Ia flowing through a power supply path Ps is zero, and the components of the entire power supply system have no power and the current sensing unit 40 will not sense current.

When the power supply apparatus 100 starts to output voltage, such as a 10-volt DC voltage (for the convenience of explanation), the current Ia flowing through the power supply path Ps is still zero since the power receiving apparatus 200 is unprepared and the power receiving apparatus 200 does not draw current. At this condition, the voltage outputted from the power supply apparatus 100 provides the power required by the components of the power supply system. The current sensing unit 40 outputs a current sensing signal Is with a first level, such as a low level according to the current Ia flowing through the power supply path Ps. Since a switch S1 of the protection circuit 30 is turned on according to the current sensing signal Is, a short circuit is formed between the positive power wire Lp+ and the negative power wire Lp−, except for a cross voltage (about 1 volt, which may be adjusted by increasing or decreasing the number of diodes) provided by a diode D11 and the switch S1.

The small voltage of 1 volt may not be able to maintain sufficient voltage for the protection circuit 30 (including the operational amplifier and/or other components) and the current sensing unit 40 since the components generally require a higher supply voltage. To solve this problem, it is necessary to select components with special specifications, which leads to difficulties in component selection and increased costs. Therefore, the self-boosting circuit 20 boosts (steps up) the small voltage of 1 volt to a large voltage of 5 to 10 volts, that is, an auxiliary voltage Va of a capacitor C12 of the self-boosting circuit 20 is built up to maintain sufficient voltage for supplying the protection circuit 30 and the current sensing unit 40 with a higher voltage to make them normally operate.

In this embodiment, the self-boosting circuit 20 is coupled to the positive power wire Lp+ through a normally-closed relay so that the small voltage of 1 volt is provided to the self-boosting circuit 20 for self-excited boost. A control end of the relay RLY is used as a receiving end of the self-boosting circuit 20 and is coupled to an output end of the logic disconnection circuit 10. The self-boosting circuit 20 includes a switch Q12 (i.e., a transistor switch in this embodiment) and a coupling coil L11. The coupling coil L11 has two magnetically coupled coils. One end of each of the two coils is commonly coupled to each other and coupled to the positive power wire Lp+, and the other end of each of the two coils is respectively coupled to a base and a collector of the switch Q12. The small voltage of 1 volt generates a base current $I_B$ flowing to the base of the switch Q12 and a collector current $I_C$ flowing to the collector of the switch Q12 through the coupling coil L11, and $I_C=\beta I_B$. When the base current $I_B$ starts to increase, the collector current $I_C$ also increases, and therefore the coupling coil L11 starts to store energy. Once the collector current $I_C$ becomes larger to cause the β value to decrease so that $I_C<\beta I_B$, the switch Q12 enters the saturation region and then enters the cutoff region, thereby turning off the switch Q12. At this condition, the energy stored in the coupling coil L11 releases to charge the capacitor C12 through a path including the diode D12 and the capacitor C12 so that the auxiliary voltage Va increases. Therefore, the function of the self-boosting circuit 20 is similar to a boost converter. In other words, the self-boosting circuit 20 converts a voltage between the positive power wire Lp+ and the negative power wire Lp− into the auxiliary voltage Va to supply power to the protection circuit 30 and the current sensing unit 40.

When the energy stored in the coupling coil L11 is completely released, the base current $I_B$ flows again and the collector current $I_C$ increases again. Therefore, the repeated energy-storing and energy-releasing operations of the coupling coil L11 to achieve the energy storage and energy release of the exciting current through the switching action of self-excited oscillation. Accordingly, the small voltage of 1 volt is boosted (stepped up) to a large voltage of 5 to 10 volts, that is, the auxiliary voltage Va is gradually increased to maintain sufficient voltage for supplying the protection circuit 30 and the current sensing unit 40 with a higher voltage to make them normally operate. The above-mentioned situation is that the power receiving apparatus 200 does not draw current or has not drawn current yet, and there is a small voltage between the positive power wire Lp+ and the negative power wire Lp− which is the same as a short circuit.

When the power receiving apparatus 200 starts to draw current, that is, the power receiving apparatus 200 starts to operate, the current Ia flowing through the power supply path Ps is no longer zero since the small voltage exists between the positive power wire Lp+ and the negative power wire Lp−. The current sensing unit 40 outputs a current sensing signal Is with a second level, such as a high level according to the current Ia flowing through the power supply path Ps. Since the switch S1 of the protection circuit 30 is turned off according to the current sensing signal Is, an open circuit is formed between the positive power wire Lp+ and the negative power wire Lp−. Since the positive power wire Lp+ and the negative power wire Lp− are not short-circuited, the power required by the protection circuit 30 and the current sensing unit 40 no longer needs to be provided by the self-boosting circuit 20. Therefore, the logic disconnection circuit 10 disables the self-boosting circuit 20, and the power supply apparatus 100 provides the required power, such as 10-volt voltage outputted from the power supply apparatus 100, for the protection circuit 30 and the current sensing unit 40.

Specifically, the 10-volt voltage outputted from the power supply apparatus 100 is divided by resistors R12, R13 to acquire a divided voltage to turn on the switch Q13. Also, the 10-volt voltage is divided by resistors R14, R15 to acquire to divided voltage to turn on the switch Q14. In addition, the Zener diode D14 provides a fixed voltage to turn on the switch Q15 and then to build a voltage on the capacitor C13. The voltage (capacitor voltage) is coupled to the coil of the relay RLY, and when the coil induces voltage, the relay RLY is activated to open. Therefore, a connection path between the positive power wire Lp+ and the self-boosting circuit 20 is disconnected so that the boost operation of the self-boosting circuit 20 is disabled due to no energy-storing path and energy-releasing path in the coupling coil L11. In other words, the self-boosting circuit 20 is coupled to the output end of the logic disconnection circuit 10 through the relay RLY, and therefore the logic disconnection circuit 10 can disable the self-boosting circuit 20 through the output end.

At this condition, the 10-volt voltage outputted from the power supply apparatus 100 charges the capacitor C12 through the diode D13. In other words, the diode D13 provides a path of charging the capacitor C12 so that the capacitor C12 can provide the sufficient auxiliary voltage Va to continuously supply power to the protection circuit 30 and the current sensing unit 40 after the self-boosting circuit 20 is disabled.

Figure 2:
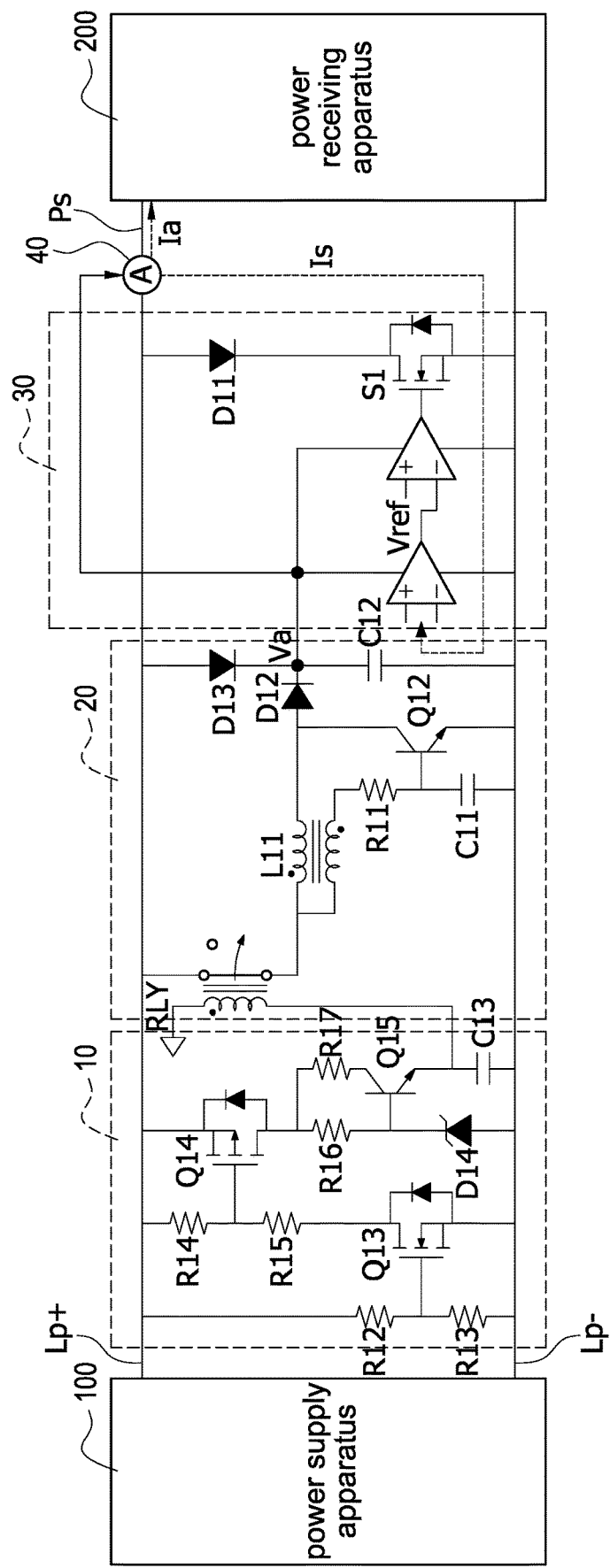
FIG. 2 is a block circuit diagram of the power supply system according to a first embodiment of the present disclosure.
Figure 3:
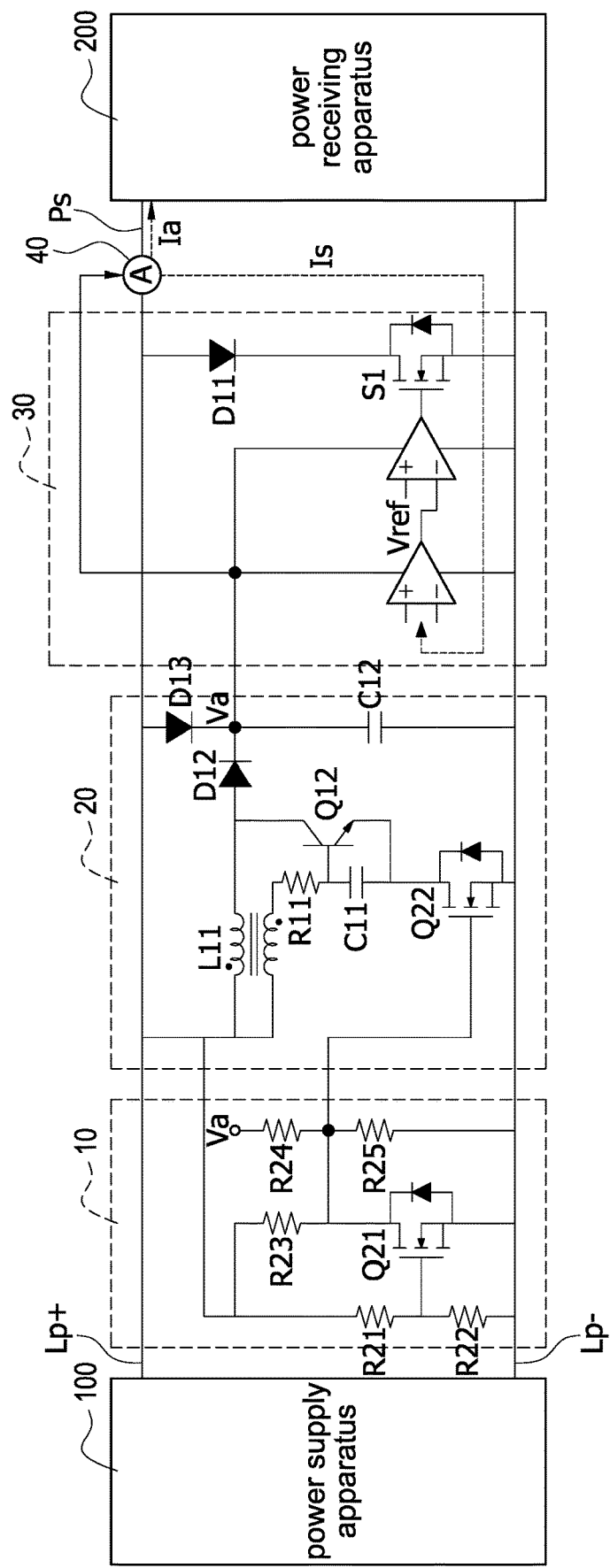
FIG. 3 is a block circuit diagram of the power supply system according to a second embodiment of the present disclosure.

Please refer to FIG. 3, which shows a block circuit diagram of the power supply system according to a second embodiment of the present disclosure. The major difference between the second embodiment and the first embodiment shown in FIG. 2 is that the logic disconnection circuits 10 are different. The self-boosting circuit 20 is coupled to the negative power wire Lp− through a switch Q22, and a control end of the switch Q22 is used as a receiving end of the self-boosting circuit 20 and is coupled to the logic disconnection circuit 10. As mentioned above, when the power receiving apparatus 200 does not draw current, the switch S1 of the protection circuit 30 is turned on so that a short circuit is formed between the positive power wire Lp+ and the negative power wire Lp−. Therefore, a small voltage of 1 volt turns on the switch Q22 through the resistor R23, however, a voltage divided by resistors R21, R22 is not enough to turn on the switch Q21, so that the self-boosting circuit 20 is enabled to be self-excited activated. The principle of boost operation is as mentioned above and the detail description is omitted here for conciseness. Therefore, the self-boosting circuit 20 boosts (steps up) the small voltage of 1 volt to a large voltage of 5 to 10 volts to maintain sufficient voltage for supplying the protection circuit 30 and the current sensing unit 40 with a higher voltage to make them normally operate.

When the power receiving apparatus 200 starts to draw current, the current Ia flowing through the power supply path Ps is no longer zero. Since the switch S1 of the protection circuit 30 is turned off, an open circuit is formed between the positive power wire Lp+ and the negative power wire Lp−. Since the positive power wire Lp+ and the negative power wire Lp− are not short-circuited, the power required by the protection circuit 30 and the current sensing unit 40 no longer needs to be provided by the self-boosting circuit 20.

Therefore, the logic disconnection circuit 10 disables the self-boosting circuit 20, and the power supply apparatus 100 provides the required power, such as 10-volt voltage outputted from the power supply apparatus 100, for the protection circuit 30 and the current sensing unit 40.

Specifically, the 10-volt voltage outputted from the power supply apparatus 100 is divided by resistors R21, R22 to acquire a divided voltage to turn on the switch Q21. Since the switch Q21 is connected to a gate and a source of a switch Q22 (take MOS as an example), the switch Q22 is turned off by a gate-source voltage of zero volt due to the turned-on switch Q21. Since the switch Q22 is turned off, a connection path between the negative power wire Lp− and the self-boosting circuit 20 is disconnected so that the boost operation of the self-boosting circuit 20 is disabled due to no energy-storing path and energy-releasing path in the coupling coil L11.

At this condition, the 10-volt voltage outputted from the power supply apparatus 100 charges the capacitor C12 through the diode D13. In other words, the diode D13 provides a path of charging the capacitor C12 so that the capacitor C12 can provide the sufficient auxiliary voltage Va to continuously supply power to the protection circuit 30 and the current sensing unit 40 after the self-boosting circuit 20 is disabled.

Figure 4:
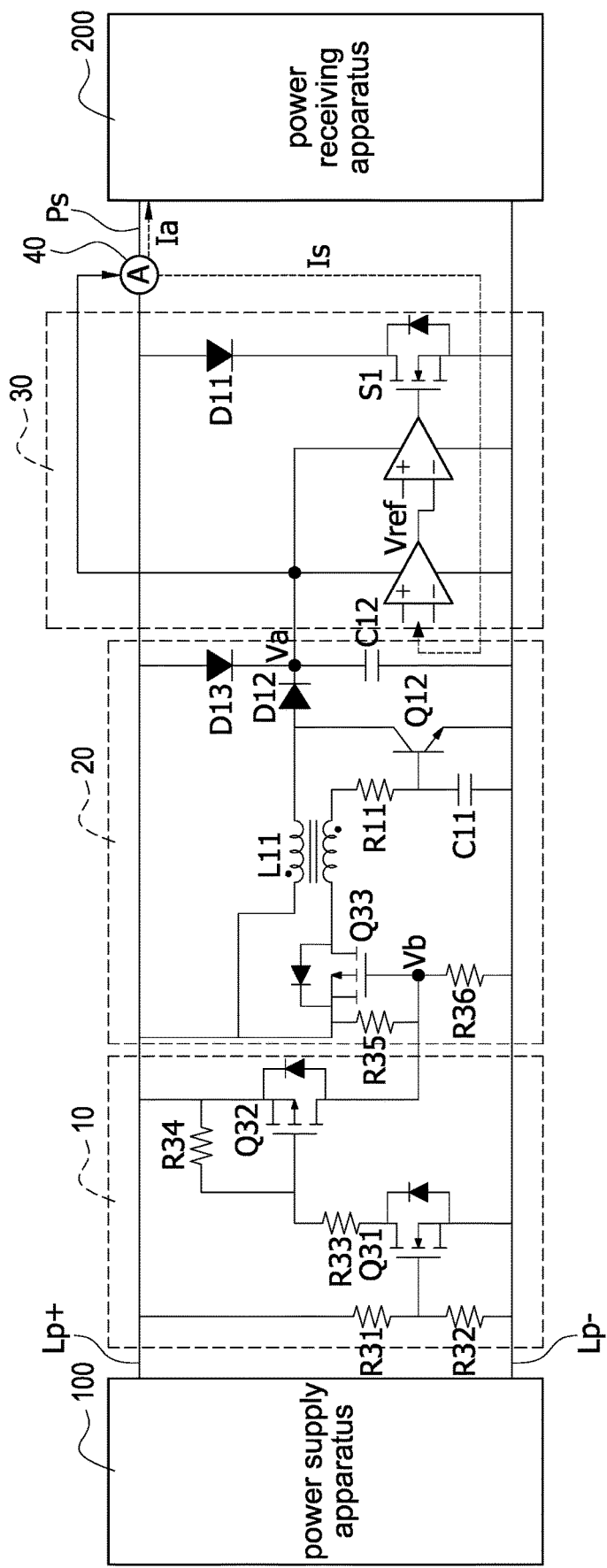
FIG. 4 is a block circuit diagram of the power supply system according to a third embodiment of the present disclosure.

Please refer to FIG. 4, which shows a block circuit diagram of the power supply system according to a third embodiment of the present disclosure. The major difference between the third embodiment and the first embodiment shown in FIG. 2 is that the logic disconnection circuits 10 are different. As mentioned above, when the power receiving apparatus 200 does not draw current, the switch S1 of the protection circuit 30 is turned on so that a short circuit is formed between the positive power wire Lp+ and the negative power wire Lp−. Therefore, a small voltage of 1 volt provides a voltage Vb through resistors R35, R36 to turn on the switch Q33 so that the self-boosting circuit 20 is enabled to be self-excited activated. The principle of boost operation is as mentioned above and the detail description is omitted here for conciseness. Therefore, the self-boosting circuit 20 boosts (steps up) the small voltage of 1 volt to a large voltage of 5 to 10 volts to maintain sufficient voltage for supplying the protection circuit 30 and the current sensing unit 40 with a higher voltage to make them normally operate.

When the power receiving apparatus 200 starts to draw current, the current Ia flowing through the power supply path Ps is no longer zero. Since the switch S1 of the protection circuit 30 is turned off, an open circuit is formed between the positive power wire Lp+ and the negative power wire Lp−. Since the positive power wire Lp+ and the negative power wire Lp− are not short-circuited, the power required by the protection circuit 30 and the current sensing unit 40 no longer needs to be provided by the self-boosting circuit 20. Therefore, the logic disconnection circuit 10 disables the self-boosting circuit 20, and the power supply apparatus 100 provides the required power, such as 10-volt voltage outputted from the power supply apparatus 100, for the protection circuit 30 and the current sensing unit 40.

Specifically, the 10-volt voltage outputted from the power supply apparatus 100 is divided by resistors R31, R32 to acquire a divided voltage to turn on the switch Q31 (take n-MOS as an example); the 10-volt voltage is also divided by resistors R33, R34 to acquire a divided voltage to turn on the switch Q32 (take p-MOS as an example). At this condition, the voltage Vb is 10 volts at the positive power wire Lp+ to turn off the switch Q33 (take p-MOS as an example). Since the switch Q33 is turned off, a connection path between the positive power wire Lp+ and the self-boosting circuit 20 is disconnected so that the boost operation of the self-boosting circuit 20 is disabled due to no energy-storing path and energy-releasing path in the coupling coil L11.

At this condition, the 10-volt voltage outputted from the power supply apparatus 100 charges the capacitor C12 through the diode D13. In other words, the diode D13 provides a path of charging the capacitor C12 so that the capacitor C12 can provide the sufficient auxiliary voltage Va to continuously supply power to the protection circuit 30 and the current sensing unit 40 after the self-boosting circuit 20 is disabled.

According to the description of FIG. 2 to FIG. 4, the logic disconnection circuit 10 disables or enables the self-boosting circuit 20 according to the voltage between the positive power wire Lp+ and the negative power wire Lp−, and therefore the circuit parameters, such as resistance values of the logic disconnection circuit 10 can be adjusted to determine conditions for disabling the self-boosting circuit 20. For example, the self-boosting circuit 20 is disabled when the voltage between the positive power wire Lp+ and the negative power wire Lp− is greater than a predetermined threshold voltage value so as to ensure that the components of the power supply system can acquire the sufficient voltage supply.

Figure 5A:
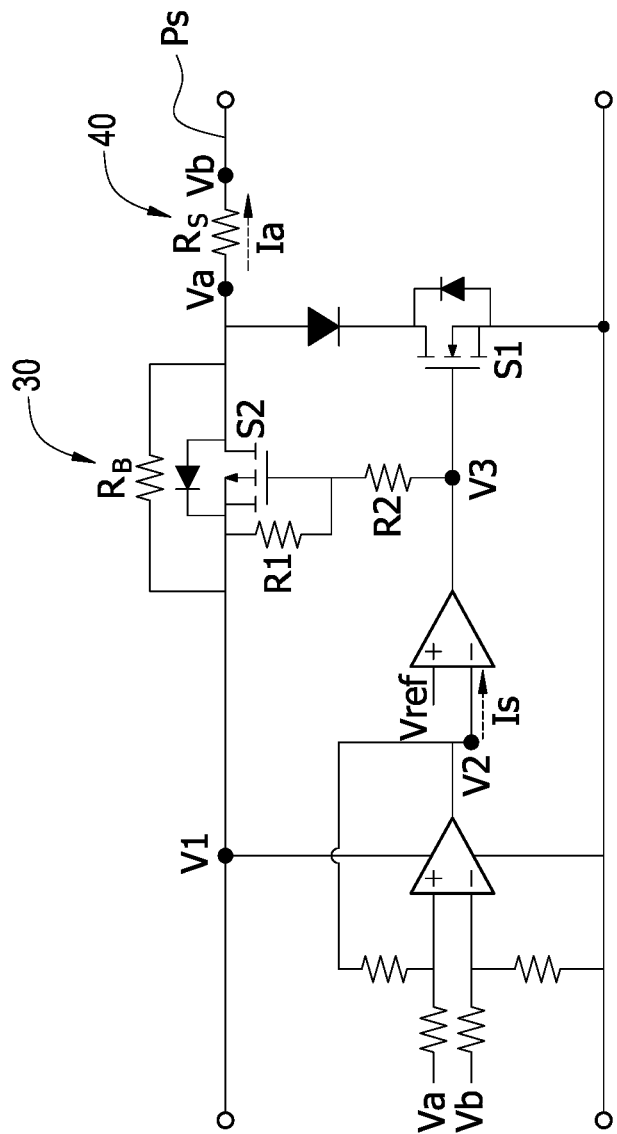
FIG. 5A to FIG. 5C are circuit diagrams of a protection circuit cooperated with a current sensing unit according to different embodiments of the present disclosure.
Figure 5B:
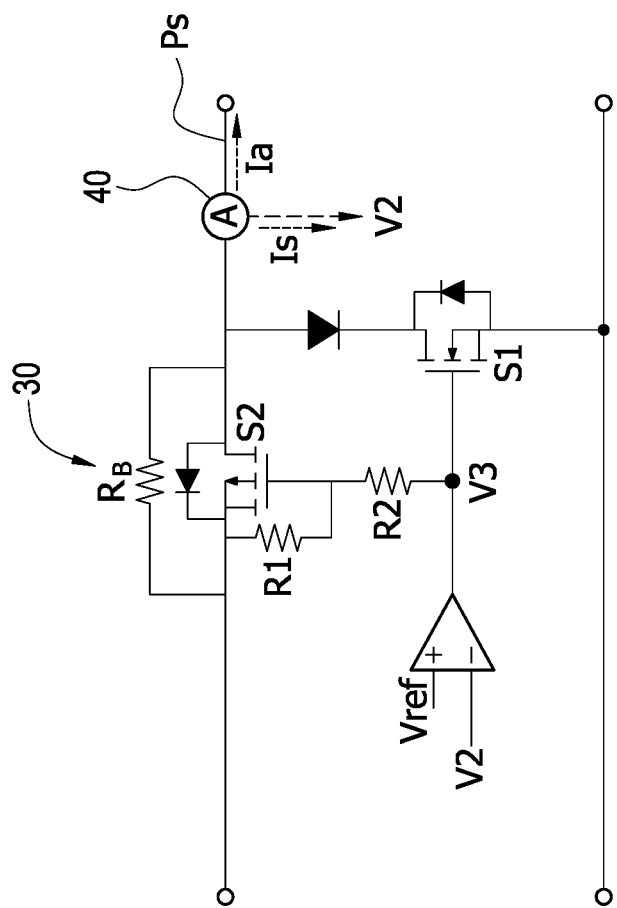
Figure 5C:
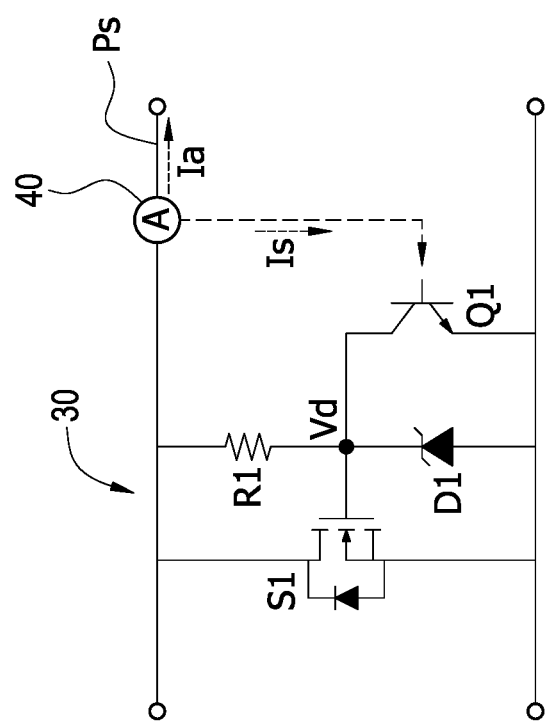

Please refer to FIG. 5A to FIG. 5C, which show circuit diagrams of a protection circuit cooperated with a current sensing unit according to different embodiments of the present disclosure, and also refer to FIG. 1. In comparison with the protection circuit 30 (having only one switch S1) shown in FIG. 2 to FIG. 4, the protection circuit 30 shown in FIG. 5A has two switches S1, S2 as the protection circuit 30, and a sensing resistor Rs is cooperated with a differential amplifier as the current sensing unit 40. In particular, the two switches S1, S2 are complementarily controlled, that is, one is turned on and the other is turned off. When the power receiving apparatus 200 does not draw current (i.e., the current Ia is zero), a voltage difference Vab between two ends of the sensing resistor Rs is zero, and therefore a voltage V2 of the current sensing signal Is is low level. Since the reference voltage Vref is greater than the voltage V2, a voltage V3 is high level so that the switch S1 is turned on and the switch S2 is turned off. On the contrary, when the power receiving apparatus 200 starts to draw current (i.e., the current Ia is not zero), the voltage difference Vab between the two ends of the sensing resistor Rs is not zero, and therefore the voltage V2 of the current sensing signal Is is high level. Since the reference voltage Vref is less than the voltage V2, the voltage V3 is low level so that the switch S1 is turned off and the switch S2 is turned on.

In comparison with FIG. 5A of using the sensing resistor Rs to sense the current Ia, a current transformer or a Hall sensor is used as the current sensing unit 40 to direct sense the current Ia in FIG. 5B without using the differential amplifier. Also, the current transformer does not require power supply to output the current sensing signal Is by the induced current or voltage due to the current flowing through the current transformer. When the power receiving apparatus 200 does not draw current (i.e., the current Ia is zero), the current sensing unit 40 outputs the voltage V2 with low level. Since the reference voltage Vref is greater than the voltage V2, the voltage V3 is high level so that the switch S1 is turned on and the switch S2 is turned off. On the contrary, when the power receiving apparatus 200 starts to draw current (i.e., the current Ia is not zero), the current sensing unit 40 outputs the voltage V2 with high level. Since the reference voltage Vref is less than the voltage V2, the voltage V3 is low level so that the switch S1 is turned off and the switch S2 is turned on.

The protection circuit 30 shown in FIG. 5C has two switches Q1, S1 as the protection circuit 30. When the power receiving apparatus 200 does not draw current (i.e., the current Ia is zero), the 10-volt voltage outputted from the power supply apparatus 100 turns on the switch S1 and there is a small voltage between the positive power wire Lp+ and the negative power wire Lp− which is the same as a short circuit. The small voltage supplies power to the current sensing unit 40, and if the current sensing current 40 requires a larger voltage, it can be powered by the self-boosting circuit 20. When the power receiving apparatus 200 starts to draw current, the current sensing signal Is outputted from the current sensing unit 40 controls the switch Q1 to be turned on. At this condition, a voltage Vd coupled to a gate of the switch S1 is zero volt so that the switch S1 is turned off, and therefore an open circuit is formed between the positive power wire Lp+ and the negative power wire Lp−. In this embodiment, since the resistance of the resistor R1 is relatively large, the current Ia will flow to the power receiving apparatus 200. In addition, the diode D1 can be replaced by a Zener diode, a transient voltage suppressor, or a regulator IC to control a voltage of driving the switch S1.

Figure 6A:
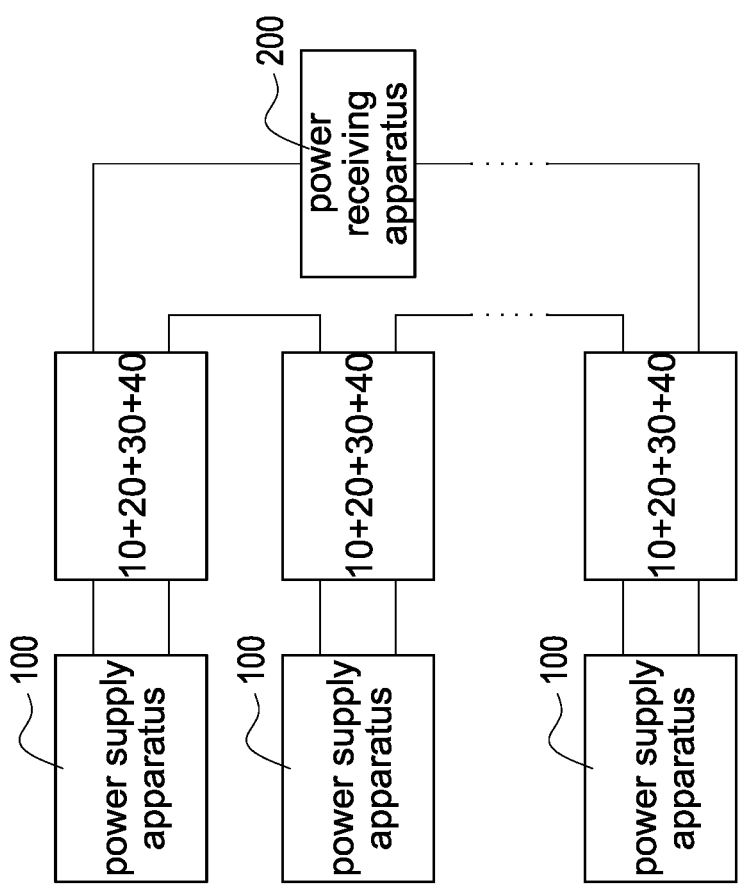
FIG. 6A to FIG. 6C are block diagrams of the power supply system operating in different applications according to the present disclosure.
Figure 6B:
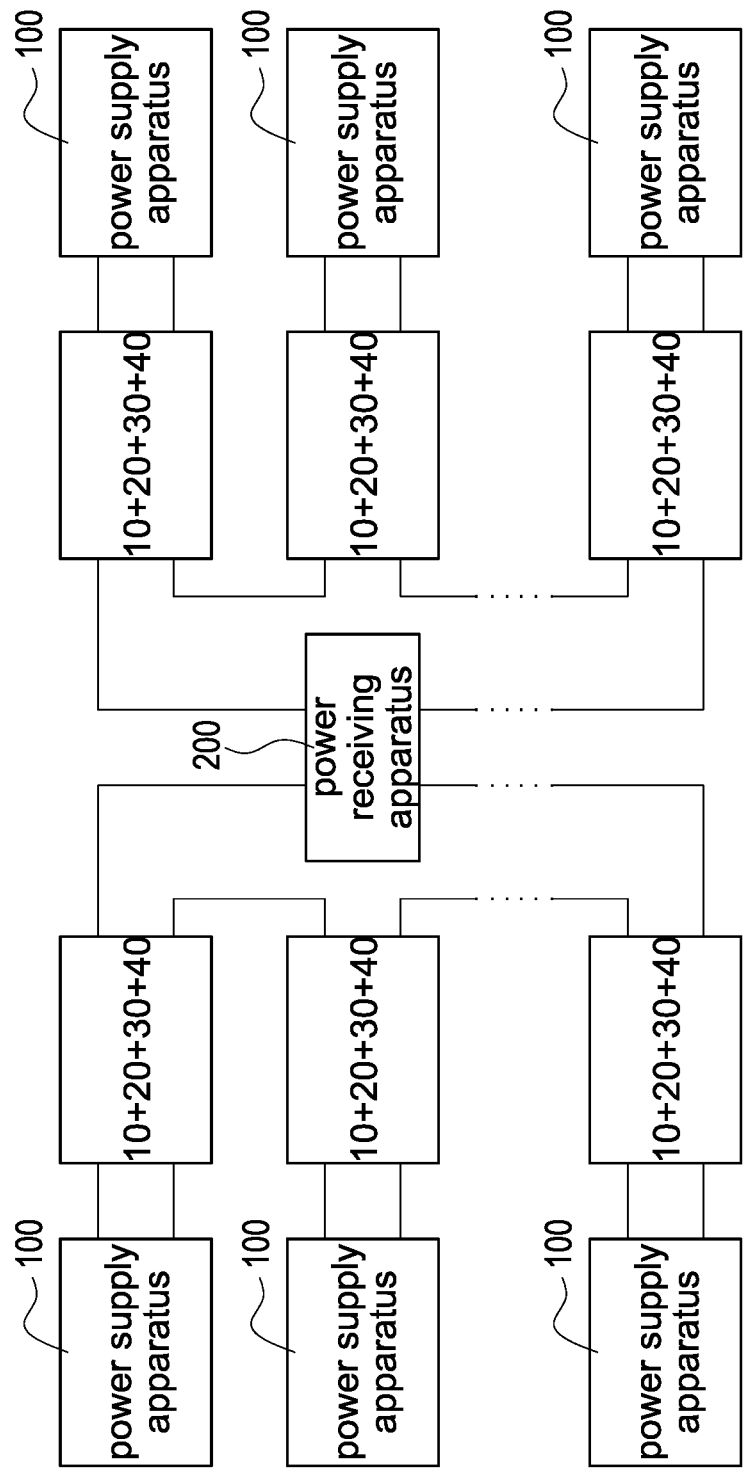
Figure 6C:
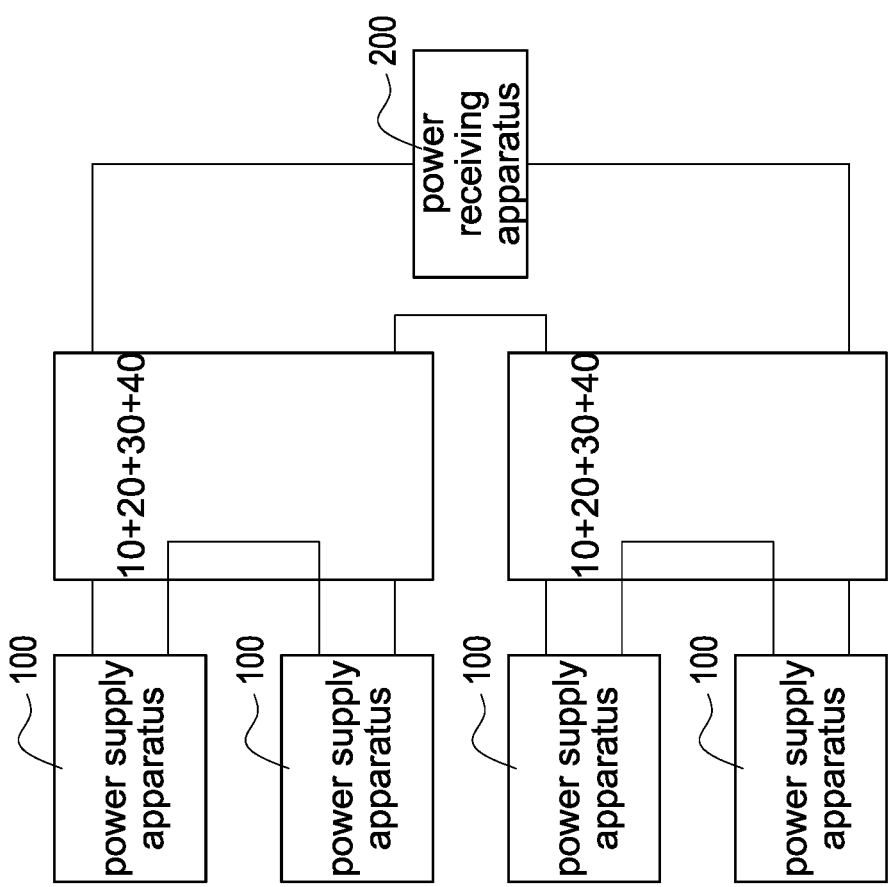

Please refer to FIG. 6A to FIG. 6C, which show block diagrams of the power supply system operating in different applications according to the present disclosure. As shown in FIG. 6A, each of a plurality of power supply apparatuses 100 with outputs connected in series is connected to the corresponding logic disconnection circuits 10, self-boosting circuits 20, protection circuits 30, and current sensing units 40 to form a single-string structure, and then connected to the power receiving apparatus 200. As shown in FIG. 6B, multiple single-string structures shown in FIG. 6A are connected to the power receiving apparatus 200. As shown in FIG. 6C, every two of a plurality of power supply apparatuses 100 with outputs connected in series are connected to the same logic disconnection circuit 10, self-boosting circuit, protection circuit 30, and current sensing unit 40, and then connected to the power receiving apparatus 200.

In conclusion, the present disclosure has following features and advantages:

1. Since the absence of the communication unit, the communication wires, and the communication protocol for the protection circuit 30, the present disclosure can effectively save the circuit cost and simplify the design of the control circuit.

2. When the power receiving apparatus 200 has not drawn current yet, the protection circuit 30 provides a short-circuited path to limit the output voltage of the power supply apparatus 100, thereby ensuring the safety of the operators and protecting the equipment.

3. When the power receiving apparatus 200 has not drawn current yet, the self-boosting circuit 20 boosts (steps up) the small voltage of 1 volt to a large voltage of 5 to 10 volts to maintain sufficient voltage for supplying the protection circuit 30 and the current sensing unit 40 with a higher voltage to make them normally operate.

4. When the power receiving apparatus 200 starts to draw current, the logic disconnection circuit 10 disables the self-boosting circuits 20 so that the power supply apparatus 100 can directly provide the required power for the protection circuit 30 and the current sensing unit 40.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply system with self-excited drive function coupled to a power receiving apparatus through a positive power wire and a negative power wire, the power supply system comprising:
    a power supply apparatus configured to output a DC power source between the positive power wire and the negative power wire,
    a logic disconnection circuit coupled between the positive power wire and the negative power wire,
    a self-boosting circuit coupled between the positive power wire and the negative power wire, and configured to convert a voltage between the positive power wire and the negative power wire into an auxiliary voltage, and a receiving end of the self-boosting circuit coupled to an output end of the logic disconnection circuit,
    a protection circuit coupled between the positive power wire and the negative power wire, and coupled to the self-boosting circuit to receive the auxiliary voltage, and
    a current sensing unit coupled to the positive power wire or the negative power wire, and configured to output a current sensing signal according to a current flowing through the positive power wire or the negative power wire,
    wherein the protection circuit makes a short circuit or an open circuit between the positive power wire and the negative power wire according to the current sensing signal, and the logic disconnection circuit disables or enables the self-boosting circuit according to the voltage between the positive power wire and the negative power wire.

2. The power supply system with self-excited drive function as claimed in claim 1, wherein when the current sensing signal is a first level, the protection circuit makes the positive power wire and the negative power wire be short-circuited; when the current sensing signal is a second level, the protection circuit makes the positive power wire and the negative power wire be open-circuited.

3. The power supply system with self-excited drive function as claimed in claim 1, wherein the protection circuit comprises a switch coupled between the positive power wire and the negative power wire; when the switch is turned on, the positive power wire and the negative power wire are short-circuited; when the switch is turned off, the positive power wire and the negative power wire are open-circuited.

4. The power supply system with self-excited drive function as claimed in claim 3, wherein the protection circuit further comprises:
    a diode coupled to the switch in series.

5. The power supply system with self-excited drive function as claimed in claim 1, wherein the protection circuit comprises a first switch coupled between the positive power wire and the negative power wire, and a second switch coupled to the positive power wire or the negative power wire; wherein the first switch and the second switch are complementarily controlled.

6. The power supply system with self-excited drive function as claimed in claim 1, wherein the self-boosting circuit comprises:
    a transistor switch,
    a coupling coil having two magnetically coupled coils, wherein one end of each of the two coils is commonly coupled to each other, and the other end of each of the two coils is respectively coupled to a base and a collector of the transistor switch, and a capacitor coupled to the collector of the transistor switch, and configured to provide the auxiliary voltage.

7. The power supply system with self-excited drive function as claimed in claim 6, wherein the self-boosting circuit further comprises a switch component; a control end of the switch component is the receiving end of the self-boosting circuit; the logic disconnection circuit disables the self-boosting circuit by turning off the switch component.

8. The power supply system with self-excited drive function as claimed in claim 7, wherein the switch component is coupled between the positive power wire and the coupling coil.

9. The power supply system with self-excited drive function as claimed in claim 7, wherein the switch component is coupled between the negative power wire and the coupling coil.

10. The power supply system with self-excited drive function as claimed in claim 6, wherein the self-boosting circuit further comprises:
  a diode coupled between the positive power wire and the capacitor.

11. The power supply system with self-excited drive function as claimed in claim 1, wherein the logic disconnection circuit disables the self-boosting circuit when the voltage between the positive power wire and the negative power wire is greater than a threshold voltage value.

12. The power supply system with self-excited drive function as claimed in claim 1, wherein the power supply apparatus is a solar panel.

13. The power supply system with self-excited drive function as claimed in claim 1, wherein the current sensing unit is a Hall sensor, and receives the auxiliary voltage.

\* \* \* \* \*